(12) United States Patent
Liu et al.

(10) Patent No.: US 9,780,845 B2
(45) Date of Patent: Oct. 3, 2017

(54) ANTENNA SYSTEM

(71) Applicant: Intel Corporation, Santa Clara, CA (US)

(72) Inventors: Tim Liu, New Taipei (TW); Andy B. Wang, Taipei (TW)

(73) Assignee: Intel Corporation, Santa Clara, CA (US)

( * ) Notice: Subject to any disclaimer, the term of this patent is extended or adjusted under 35 U.S.C. 154(b) by 8 days.

(21) Appl. No.: 14/669,625

(22) Filed: Mar. 26, 2015

(65) Prior Publication Data

US 2016/0285524 A1    Sep. 29, 2016

(51) Int. Cl.
*H04L 1/02*    (2006.01)
*H04B 7/0413*    (2017.01)
(Continued)

(52) U.S. Cl.
CPC ......... *H04B 7/0413* (2013.01); *G06F 1/1632* (2013.01); *H04B 7/0404* (2013.01); *H04B 5/0031* (2013.01); *H04M 1/04* (2013.01)

(58) Field of Classification Search
CPC ... H04W 88/00; H04W 88/021; H04W 88/06; H04W 92/00; H04W 84/12; H04W 92/04; H04W 4/008; H04W 80/00; G06F 1/1632; G06F 1/1626; G06F 1/266; G06F 1/163; G06F 1/1669; H04M 2250/02; H04M 1/7253; H04M 1/04; H04M 1/0202; H04M 1/6033; H04M 1/6066; H04M 2215/2026; H04M 2215/32; H04M 1/6091; H04M 1/0274; H04M 2250/04; H04M 2250/06; H04M 2250/08; H04M 1/0245; H04L 69/18; H04L 69/14; H04B 7/04; H04B 7/2668; H01Q 1/241
(Continued)

(56) References Cited

U.S. PATENT DOCUMENTS 5,940,767 A * 8/1999 Bourgeois ............... H04M 1/04
455/349
2011/0167180 A1 7/2011 Towell et al.
(Continued)

FOREIGN PATENT DOCUMENTS

KR    20130090102 A    8/2013

OTHER PUBLICATIONS

Extended Search Report dated Jul. 14, 2016 for European Patent Application No. 16155780.6.

*Primary Examiner* — Rahel Guarino
(74) *Attorney, Agent, or Firm* — Schiff Hardin LLP

(57) ABSTRACT

A communication system that includes a mobile device configured to dock with an external dock. The mobile device can include a docking interface and a transceiver having one or more antennas. The docking interface can establish a connection with the external dock. The external dock can include one or more antennas that are configured to connect to transceiver via the docking interface when the mobile device is connected to the external dock. The antenna(s) of the mobile device and the antenna(s) of the external dock can cooperatively communicate with one or more communication environments. The antenna(s) of the mobile device and the antenna(s) of the external dock can be configured as a Multiple-input Multiple-output (MIMO) antenna system.

20 Claims, 3 Drawing Sheets

(51) Int. Cl.
*G06F 1/16* (2006.01)
*H04B 7/0404* (2017.01)
*H04B 5/00* (2006.01)
*H04M 1/04* (2006.01)

(58) Field of Classification Search
USPC ........ 375/267; 455/557, 414.4, 426.2, 575.1, 455/554.2; 345/2.3; 343/876; 379/413.03
See application file for complete search history.

(56) References Cited

U.S. PATENT DOCUMENTS

2014/0057621 A1* 2/2014 Ji .................. H04M 1/72527
  455/419
2014/0354226 A1 12/2014 Draaijer et al.

* cited by examiner

ANTENNA SYSTEM

BACKGROUND

Field

Aspects described herein generally relate to antenna systems, including one or more external antennas communicatively coupled via a docking interface.

Related Art

Wireless communication environments can use multi-antenna techniques that include multiple antennas at a transmitter, receiver, and/or transceiver. The multi-antenna techniques can be grouped into three different categories: diversity, interference suppression, and spatial multiplexing. These three categories are often collectively referred to as Multiple-input Multiple-output (MIMO) communication even though not all of the multi-antenna techniques that fall within these categories require at least two antennas at both the transmitter and receiver.

BRIEF DESCRIPTION OF THE DRAWINGS/FIGURES

The accompanying drawings, which are incorporated herein and form a part of the specification, illustrate the aspects of the present disclosure and, together with the description, further serve to explain the principles of the aspects and to enable a person skilled in the pertinent art to make and use the aspects.

The exemplary aspects of the present disclosure will be described with reference to the accompanying drawings. The drawing in which an element first appears is typically indicated by the leftmost digit(s) in the corresponding reference number.

DETAILED DESCRIPTION

In the following description, numerous specific details are set forth in order to provide a thorough understanding of the aspects of the present disclosure. However, it will be apparent to those skilled in the art that the aspects, including structures, systems, and methods, may be practiced without these specific details. The description and representation herein are the common means used by those experienced or skilled in the art to most effectively convey the substance of their work to others skilled in the art. In other instances, well-known methods, procedures, components, and circuitry have not been described in detail to avoid unnecessarily obscuring aspects of the disclosure.

Figure 1A:
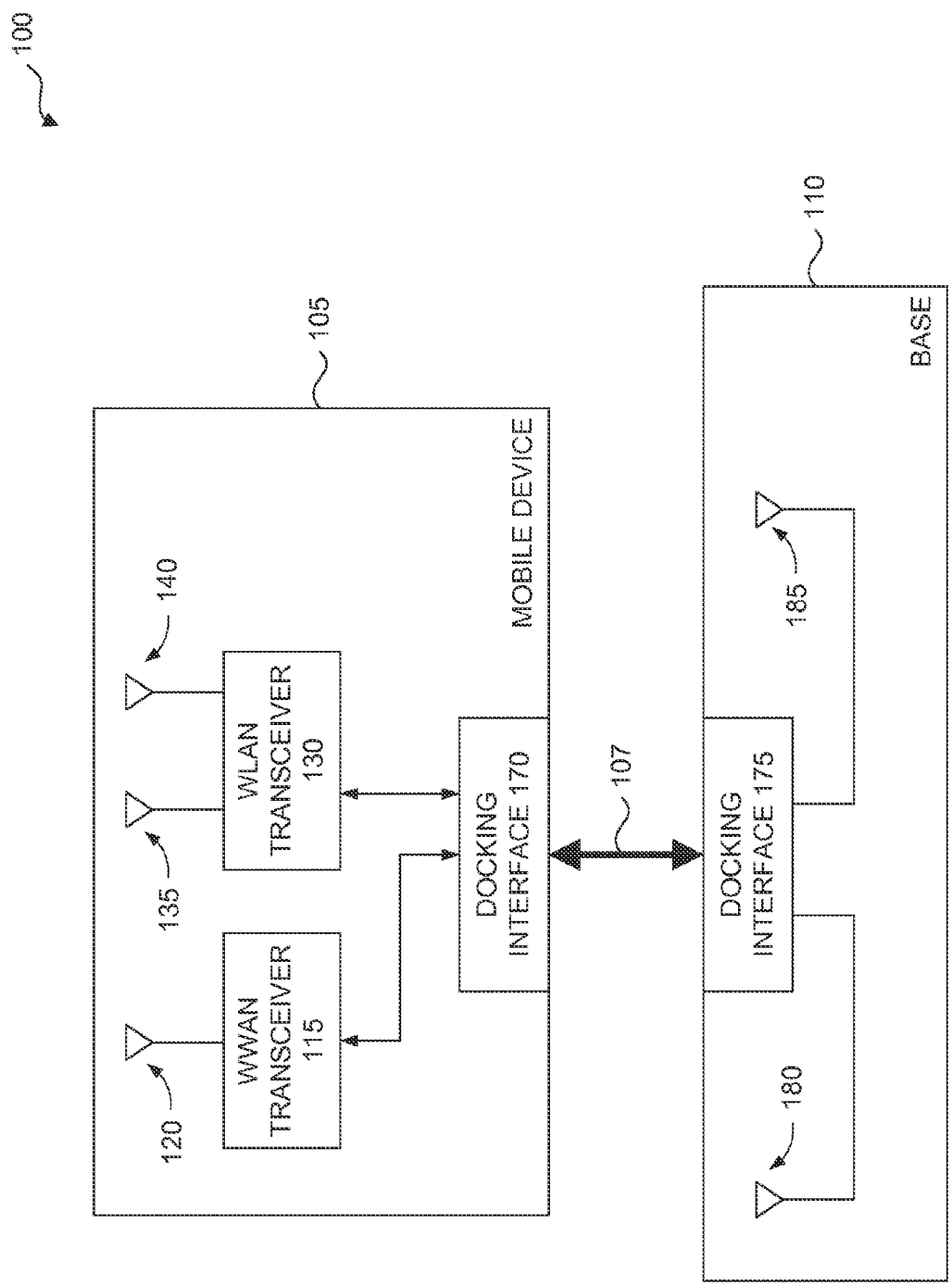
FIG. 1A illustrates a communication system according to an exemplary aspect of the present disclosure.

FIG. 1A illustrates a communication system 100 according to an exemplary aspect of the present disclosure. The communication system 100 includes a mobile device 105 communicatively coupled to a base 110 via docking communication channel 107.

The mobile device 105 can include first transceiver 115 and a second transceiver 130. In an exemplary aspect, the first transceiver 115 is a wireless wide area network (WWAN) transceiver configured to communicate using one or more wireless communication protocols (e.g., LTE, GSM, CDMA, etc.) in a WAN configuration. The second transceiver 130 is a wireless local area network (WLAN) transceiver configured to communicate using one or more wireless communication protocols (e.g., WLAN, Bluetooth, NFC, etc.) in a LAN configuration. Although not illustrated, the mobile device 105 can include processor circuitry configured to control the overall operation of the mobile device 105, including management and/or control of the docking interface 170 and/or the transceivers 115 and/or 130. The processor circuitry can also be configured to determine whether the mobile device 105 has docked/de-docked with/from the base 110 and to facilitate the configuration and use of antennas from the base 110 by the mobile device 105. Further, the mobile device 105 can include one or more internal and/or external memories that store data and/or instructions.

For the purpose of this discussion, aspects of the disclosure will describe the first transceiver 115 as being configured to transmit and/or receive wireless communications conforming to the Long-term Evolution (LTE) communication standard, and the second transceiver 130 being configured to transmit and/or receive wireless communications conforming to the WLAN (IEEE 802.11) standard. However, the first transceiver 115 and the second transceiver 130 are not limited to these communication standards, and the first transceiver 115 and/or the second transceiver 130 can use one or more other communication protocols/standards in addition to, or as an alternative to these standards, as would be understood by one of ordinary skill in the relevant arts.

The first transceiver 115 includes processor circuitry that is configured to transmit and/or receive wireless communications conforming to one or more wireless communication protocols (e.g., Long-term Evolution (LTE)) via antenna 120. The antenna 120 may include an integer array of antennas, and that the antenna 120 may be capable of both transmitting and receiving wireless communication signals. In some exemplary aspects, the first transceiver 115 may also include one or more other antennas in addition to the antenna 120.

The second transceiver 130 includes processor circuitry that is configured to transmit and/or receive wireless communications conforming to one or more wireless communication protocols (e.g., Wi-Fi) via antennas 135 and/or 140. The antennas 135 and/or 140 may each include an integer array of antennas, and that the antennas 135 and/or 140 may each be capable of both transmitting and receiving wireless communication signals. In some exemplary aspects, the second transceiver 130 may also include one or more other antennas in addition to the antennas 135/140.

In exemplary aspects, the first transceiver 115 and/or the second transceiver 130 can include (but are not limited to) a digital signal processer (DSP), modulator and/or demodulator, a digital-to-analog converter (DAC) and/or an analog-to-digital converter (ADC), and/or a frequency converter (including mixers, local oscillators, and filters) that can be utilized in transmitting and/or receiving of wireless communications.

In an exemplary aspect, the first transceiver 115 and/or the second transceiver 130 can be configured to perform wireless communication utilizing a Multiple-input Multiple-output (MIMO) configuration. Further, in an exemplary aspect, the first transceiver 115 and/or the second transceiver 130 can be configured to implement Carrier Aggregation (CA), including intra-band contiguous (adjacent) CA, intra-band non-contiguous (non-adjacent) CA, and/or inter-band CA.

In an exemplary aspect, the mobile device 105 includes a docking interface 170 that is communicatively coupled to the first transceiver 115 and the second transceiver 130. The base 110 includes a docking interface 175 that is communicatively coupled to a first antenna 180 and a second antenna 185. The antennas 180 and/or 185 may each include an integer array of antennas, and that the antennas 180 and/or 185 may each be capable of both transmitting and receiving wireless communication signals. Although not illustrated, the base 110 can include processor circuitry configured to control the overall operation of the base, including management and/or control of the docking interface 175 and/or included transceivers in some aspects. The processor circuitry can also be configured to determine whether the base 110 has docked/de-docked with/from the mobile device 105 and to facilitate the configuration and use of antennas by the mobile device 105. Further, the base 110 can include one or more internal and/or external memories that store data and/or instructions.

The docking interfaces 170 and 175 can include processor circuitry configured to establish the docking communication channel 107 between the interfaces 170 and 175. In an exemplary aspect, the docking communication channel 107 is a wired connection. In some exemplary aspects, the docking communication channel 107 can be a wireless connection or a combination of a wired and a wireless connection. In exemplary aspects in which the docking interfaces 170 and 175 are configured to establish a wireless docking communication channel 107, the docking interfaces 170 and 175 can each include one or more transceivers configured to transmit and/or receive wireless communications conforming to one or more wireless communication protocols. Further, in exemplary aspects that include a wireless docking communication channel 107, the interfaces 170 and 175 can be configured to transmit/receive electrical power between each other using one or more inductive charging mechanisms.

In an exemplary aspect, the docking interface 170 and the docking interface 175 are configured to connect to each other to establish the docking communication channel 107. The docking communication channel 107 can be configured to transmit and/or receive communication signals associated with the first transceiver 115 and/or the second transceiver 130 and one or more corresponding antennas, electrical power, command signals, data, and/or other information as would be understood by one of ordinary skill in the relevant arts.

In operation, when the docking communication channel 107 has been established between the docking interface 170 and the docking interface 175 (i.e., the mobile device 105 is docked with the base 110), the first transceiver 115 and/or the second transceiver 130 can be configured to use one or more of the antennas 180 and/or 185 within the base 110. For example, the antenna 180 of the base 110 can function as an auxiliary antenna for the first transceiver 115 that is communicatively coupled to the antenna 180 via the docking communication channel 107. Similarly, antenna 185 can function as an auxiliary antenna for the second transceiver 130. By using the antennas 180 and/or 185 of the base 110, the mobile device 105 can increase the wireless performance of the transceivers 115 and/or 130. In some exemplary aspect, both of the antennas 180 and 185 can function as auxiliary antennas for one or both of the transceivers 115 and 130.

Figure 1B:
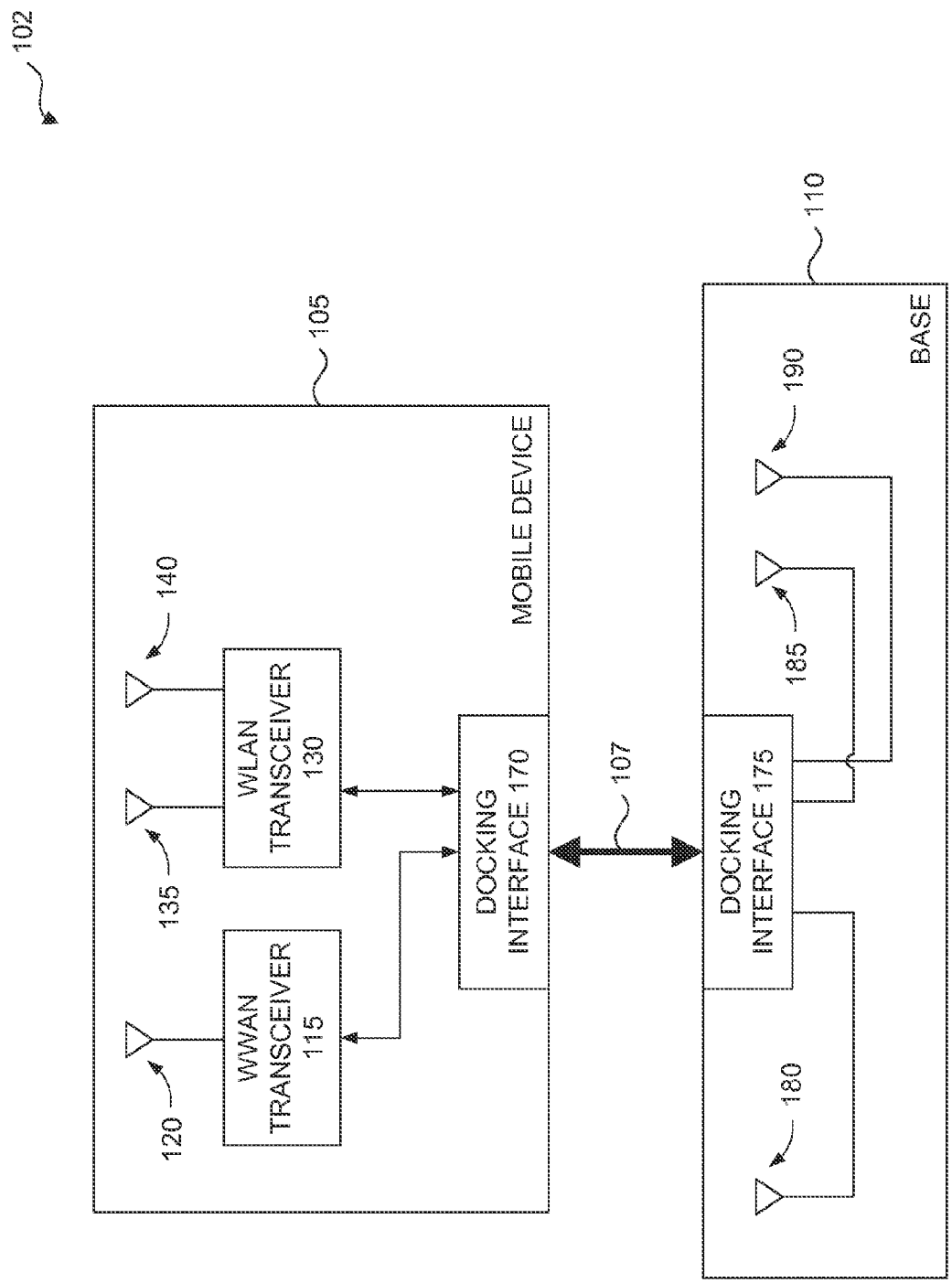
FIG. 1B illustrates a communication system according to an exemplary aspect of the present disclosure.

As illustrated in FIG. 1B, the base 110 is not limited to antennas 180 and 185, and can include one or more other antennas 190. Similarly, although not illustrated, the transceivers 115 and 130 are not limited to having antennas 120, 135, and 140, and can have more or fewer antennas than those illustrated.

In operation, when the docking communication channel 107 has been established between the docking interface 170 and the docking interface 175 (i.e., the mobile device 105 is docked with the base 110), the second transceiver 130 can be configured to use one or more of the antennas 185 and/or 190 within the base 110. For example, the antenna 185 and/or 190 of the base 110 can function as an auxiliary antenna for the second transceiver 130. In an exemplary aspect, the second transceiver 130 can be configured to wirelessly communicate using antennas 185 and 190 cooperatively with local antennas 135 and 140. For example, the second transceiver 130 can be configured to use combinations of the antennas 185, 190, 135, and 140 in a MIMO configuration.

In an exemplary aspect, one or more of the antennas 180, 185 and/or 190 can be configured to transmit and/or receive wireless communications conforming to one or more wireless communication protocols different from the protocols implemented by the transceivers 115 and/or 130 using antennas 120, 135, and/or 140. For example, when the mobile device 105 is docked with the base 110, one or more of the antennas 180, 185 and/or 190 can be used by the mobile device 105 to communicate on one or more protocols unavailable to the mobile device 105 in an un-docked state (i.e., when the mobile device 105 is disconnected from the base 110).

In an exemplary aspect, the base 110 can include one or more transceivers. The transceiver(s) can have processor circuitry that is configured to transmit and/or receive wireless communications conforming to one or more wireless communication protocols via antennas 180, 185 and/or 190. The protocols can be different or the same as those protocols used by the transceivers 115 and/or 130.

Figure 2:
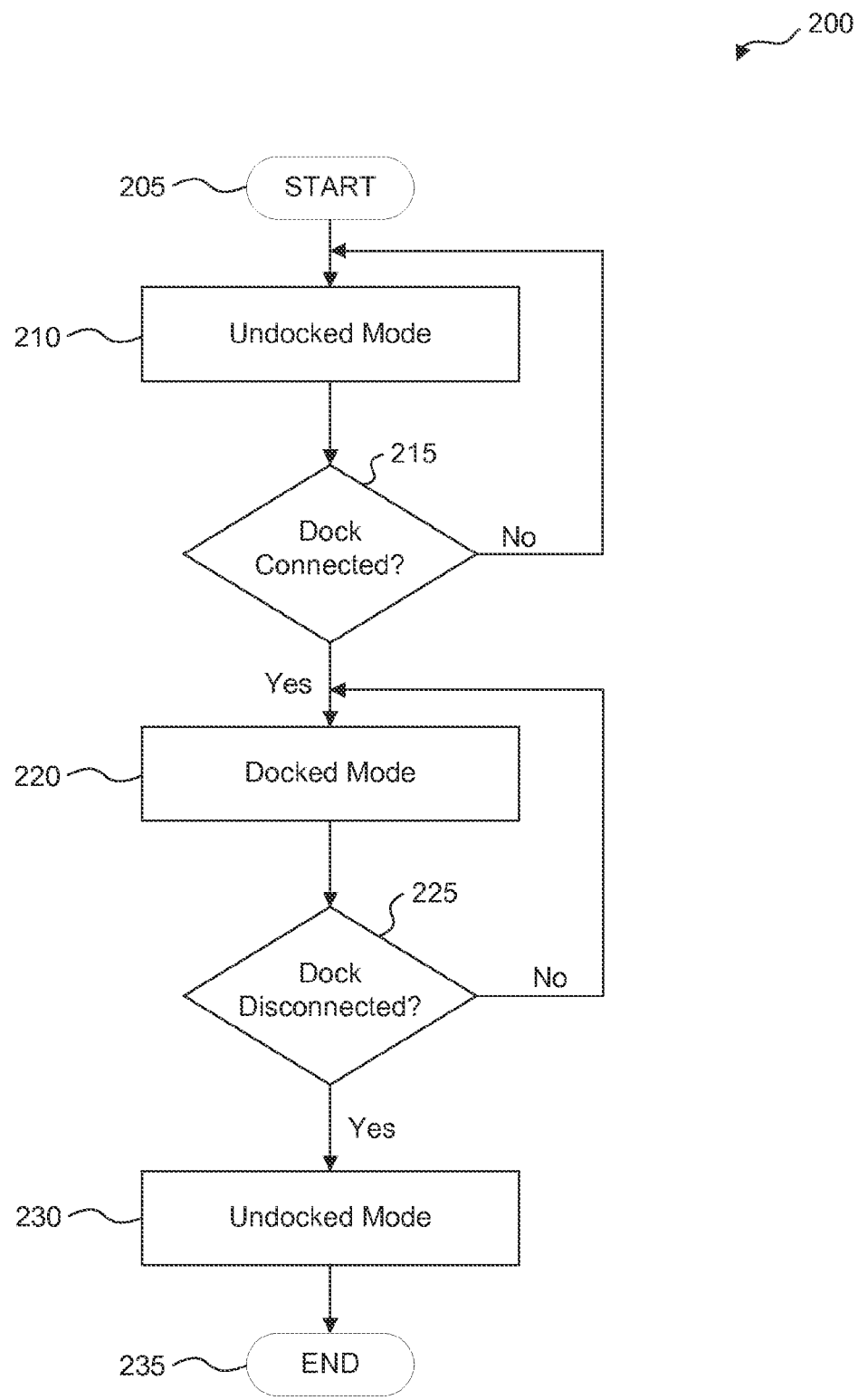
FIG. 2 illustrates a docking process according to an exemplary aspect of the present disclosure.

FIG. 2 illustrates a flowchart 200 of a docking method in accordance with an exemplary aspect of the present disclosure. The method of flowchart 200 is described with continued reference to FIGS. 1A and 1B. The steps of the method of flowchart 200 are not limited to the order described below, and the various steps may be performed in a different order. Further, two or more steps of the method of flowchart 200 may be performed simultaneously with each other.

The method of flowchart 200 begins at step 205 and transitions to step 210, where the communication system enters or remains in an undocked mode. The undocked mode is when the mobile device 105 is not docked the base 110 via the docking communication channel 107.

After step 210, flowchart 200 transitions to step 215, where the mobile device 105 and/or the base 110 determine if the mobile device 105 has docked with the base 110. In some exemplary aspects, the mobile device 105 determines that the mobile device 105 has docked with the base 110. In this example, the mobile device 105 can instruct the base 110 that one or more of the antennas 180, 185 and/or 190 will be configured for use by the mobile device 105. In some aspects, the base 110 can perform similar processing and instruct the mobile device 110 on the availability of one or more of the antennas 180, 185 and/or 190.

If it is determined that the mobile device 105 has docked with the base 110 (Yes at step 215), the flowchart 200 transitions to step 220. Otherwise (No at step 215), the flowchart returns to step 210.

At step 220, the communication system enters or remains in a docked mode. The docked mode is when the mobile device 105 is docked (connected to) the base 110 via the docking communication channel 107.

After step 220, flowchart 200 transitions to step 225, where the mobile device 105 and/or the base 110 determine if the mobile device 105 has de-docked from the base 110. In some exemplary aspects, the mobile device 105 determines that the mobile device 105 has de-docked from the base 110. In this example, the mobile device 105 can be configured for use only local antennas 120, 135, and/or 140 in response to determining that the mobile device 105 has been disconnected from the base 110.

If it is determined that the mobile device 105 has de-docked from the base 110 (Yes at step 225), the flowchart 200 transitions to step 230. Otherwise (No at step 225), the flowchart returns to step 220.

At step 230, the communication system enters or remains in an undocked mode. The undocked mode is when the mobile device 105 is not docked (connected to) the base 110 via the docking communication channel 107.

After step 230, the flowchart transitions to step 235, where the flowchart 200 ends.

In the flowchart of 200, if the mobile device 105 and the base 110 are in a docked mode upon power-on or start-up of the mobile device 105 and/or base 110, the flowchart 200 can begin at step 220.

Examples of the mobile device 105 include (but are not limited to) a mobile computing device—such as a laptop computer, a tablet computer, a mobile telephone or smartphone, a "phablet," a personal digital assistant (PDA), and the like; and a wearable computing device—such as a computerized wrist watch or "smart" watch, computerized eyeglasses, and the like.

Examples of the base 110 include (but are not limited to) a keyboard; a multimedia dock—such as a speaker system, a radio, a media player, a television, a projector or other display device, or a connection hub connectable to one or more other media devices or displays; a charging station; a mounting stand; a peripheral hub; a printer; entertainment center; a personal/desktop computer; automotive/aeronautical/maritime in-dash computer terminal; a networking device—such as a router, a switch, or a modem; a remote control terminal; a telephone terminal; a computer kiosk; a household appliance; and the like. In some aspects of the present disclosure, the base 110 may be another mobile device.

The exemplary aspects described herein can use wireless communications conforming to one or more wireless communication protocols or standards, including, for example, Long-Term Evolution (LTE), LTE Advanced, Evolved High-Speed Packet Access (HSPA+), Wideband Code Division Multiple Access (W-CDMA), CDMA2000, Time Division-Synchronous Code Division Multiple Access (TD-SCDMA), Global System for Mobile Communications (GSM), General Packet Radio Service (GPRS), Enhanced Data Rates for GSM Evolution (EDGE), Worldwide Interoperability for Microwave Access (WiMAX) (IEEE 802.16), WLAN (IEEE 802.11), Bluetooth, Near-field Communication (NFC) (ISO/IEC 18092), ZigBee (IEEE 802.15.4), Radio-frequency identification (RFID), infrared communications, and/or one or more other communications protocols/standards as would be understood by one of ordinary skill in the relevant arts. These various standards and/or protocols are each incorporated herein by reference in their entirety.

Example 1 is a communication system, comprising a mobile device including a first transceiver coupled to a first antenna configured to communicate using a first communication protocol via the first antenna, and a first docking interface communicatively coupled to the first transceiver; and a base device including: a second antenna, and a second docking interface communicatively coupled to the second antenna and configured to connect to the first docking interface to communicatively couple the second antenna to the first transceiver, wherein the first transceiver is configured to communicate via the second antenna in response to a connection of the first docking interface with the second docking interface.

In Example 2, the subject matter of Example 1, wherein the first transceiver is configured to communicate using the second antenna cooperatively with the first antenna.

In Example 3, the subject matter of Example 1, wherein the first transceiver is configured to communicate via the first and the second antennas in a Multiple-input Multiple-output (MIMO) configuration.

In Example 4, the subject matter of Example 1, wherein the mobile device includes a second transceiver coupled to a third antenna, the second transceiver being configured to communicate using a second communication protocol via the third antenna, wherein the second transceiver is communicatively coupled to the first docking interface.

In Example 5, the subject matter of Example 4, wherein the base device includes a fourth antenna communicatively coupled to the second docking interface, and wherein the second transceiver is configured to communicate via the fourth antenna in response to the connection of the first docking interface with the second docking interface.

In Example 6, the subject matter of Example 1, wherein the second docking interface is configured to connect to the first docking interface using a wired connection.

In Example 7, the subject matter of Example 1, wherein a connection established between the second docking interface and the first docking interface is configured to supply electrical power from the base device to the mobile device.

In Example 8, the subject matter of Example 1, wherein the base device further comprises a memory that is accessible to the mobile device via a connection established between the second docking interface and the first docking interface.

Example 9 is a mobile device, comprising: a transceiver coupled to a first antenna configured to communicate using a first communication protocol via the first antenna; and a docking interface communicatively coupled to the transceiver and configured to connect the mobile device to an external base device coupled to a second antenna, wherein, in response to the mobile device connecting to the external base device via the docking interface, the transceiver is configured to communicate using the second antenna of the external base device.

In Example 10, the subject matter of Example 9, wherein the transceiver is configured to communicate using the second antenna cooperatively with the first antenna.

In Example 11, the subject matter of Example 9, wherein the transceiver is configured to communicate via the first and the second antennas in a Multiple-input Multiple-output (MIMO) configuration.

In Example 12, the subject matter of Example 9, wherein the mobile device includes a second transceiver coupled to a third antenna, the second transceiver being configured to communicate using a second communication protocol via the third antenna, wherein the second transceiver is communicatively coupled to the docking interface.

In Example 13, the subject matter of Example 12, wherein the external base device includes a fourth antenna; and wherein the second transceiver is configured to communicate via the fourth antenna in response to the mobile device connecting to the external base device via the docking interface.

In Example 14, the subject matter of Example 9, wherein the docking interface is configured to establish a wired connection with the external device to connect the mobile device to the external base device.

In Example 15, the subject matter of Example 9, wherein the mobile device is configured to receive electrical power from the external base device via the docking interface.

In Example 16, the subject matter of Example 9, wherein the mobile device is configured to access an external memory within the external base device via the docking interface.

Example 17 is an external base device, comprising: an antenna; and a docking interface communicatively coupled to the antenna, and configured to connect to a mobile device, wherein, in response to the docking interface connecting to the mobile device, the docking interface is configured to communicative couple the antenna to a transceiver in the mobile device.

In Example 18, the subject matter of Example 17, wherein the antenna is configured to communicate with a communication protocol cooperatively with another antenna within the mobile device.

In Example 19, the subject matter of Example 17, wherein the antenna is configured as a Multiple-input Multiple-output (MIMO) antenna that cooperatively communicates together with another antenna within the mobile device in a MIMO configuration.

In Example 20 the subject matter of Example 17, wherein the docking interface is configured to establish a wired connection with the mobile device to connect the external base device to the mobile device.

Example 21 is a communication system, comprising a mobile device including first transceiving means coupling to a first antenna, the first transceiving means for communicating using a first communication protocol via the first antenna, and first docking interface means communicatively coupled to the first transceiving means; and a base device including a second antenna, and second docking interface means communicatively coupled to the second antenna, the second docking interface means for connecting to the first docking interface means to communicatively couple the second antenna to the first transceiving means, wherein the first transceiving means is further configured for communicating via the second antenna in response to a connection of the first docking interface means with the second docking interface means.

In Example 22, the subject matter of Example 21, wherein the first transceiving means is further configured for communicating using the second antenna cooperatively with the first antenna.

In Example 23, the subject matter of Example 21, wherein the first transceiving means is further configured for communicating via the first and the second antennas in a Multiple-input Multiple-output (MIMO) configuration.

In Example 24, the subject matter of any of Examples 21-23, wherein the mobile device includes second transceiving means coupling to a third antenna, the second transceiving means for communicating using a second communication protocol via the third antenna, wherein the second transceiving means is communicatively coupled to the first docking interface.

In Example 25, the subject matter of Example 24, wherein the base device includes a fourth antenna communicatively coupled to the second docking interface means; and wherein the second transceiving means is further configured for communicating via the fourth antenna in response to the connection of the first docking interface means with the second docking interface means.

In Example 26, the subject matter of any of Examples 21-23, wherein the second docking interface means is further configured for connecting to the first docking interface means using a wired connection.

In Example 27, the subject matter of any of Examples 21-23, wherein a connection established between the second docking interface means and the first docking interface means is for supplying electrical power from the base device to the mobile device.

In Example 28, the subject matter of any of Examples 21-23, wherein the base device further comprises memory means accessible to the mobile device via a connection established between the second docking interface means and the first docking interface means.

In Example 29, the subject matter of Example 21, wherein the mobile device includes second transceiving means coupling to a third antenna, the second transceiving means for communicating using a second communication protocol via the third antenna, wherein the second transceiving means is communicatively coupled to the first docking interface.

In Example 30, the subject matter of Example 29, wherein the base device includes a fourth antenna communicatively coupled to the second docking interface means; and wherein the second transceiving means is further configured for communicating via the fourth antenna in response to the connection of the first docking interface means with the second docking interface means.

In Example 31, the subject matter of Example 21, wherein the second docking interface means is further configured for connecting to the first docking interface means using a wired connection.

In Example 32, the subject matter of Example 21, a connection established between the second docking interface means and the first docking interface means is for supplying electrical power from the base device to the mobile device.

In Example 33, the subject matter of any of Examples 1-2, wherein the first transceiver is configured to communicate via the first and the second antennas in a Multiple-input Multiple-output (MIMO) configuration.

In Example 34, the subject matter of any of Examples 1-3, wherein the mobile device includes a second transceiver coupled to a third antenna, the second transceiver being configured to communicate using a second communication protocol via the third antenna, wherein the second transceiver is communicatively coupled to the first docking interface.

In Example 35, the subject matter of any of Example 34, wherein the base device includes a fourth antenna communicatively coupled to the second docking interface; and wherein the second transceiver is configured to communicate via the fourth antenna in response to the connection of the first docking interface with the second docking interface.

In Example 36, the subject matter of any of Examples 1-5, wherein the second docking interface is configured to connect to the first docking interface using a wired connection.

Example 37 is an apparatus substantially as shown and described.

CONCLUSION

The aforementioned description of the specific aspects will so fully reveal the general nature of the disclosure that others can, by applying knowledge within the skill of the art, readily modify and/or adapt for various applications such specific aspects, without undue experimentation, and without departing from the general concept of the present disclosure. Therefore, such adaptations and modifications are intended to be within the meaning and range of equivalents of the disclosed aspects, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

References in the specification to "one aspect," "an aspect," "an exemplary aspect," etc., indicate that the aspect described may include a particular feature, structure, or characteristic, but every aspect may not necessarily include the particular feature, structure, or characteristic. Moreover, such phrases are not necessarily referring to the same aspect. Further, when a particular feature, structure, or characteristic is described in connection with an aspect, it is submitted that it is within the knowledge of one skilled in the art to affect such feature, structure, or characteristic in connection with other aspects whether or not explicitly described.

The exemplary aspects described herein are provided for illustrative purposes, and are not limiting. Other exemplary aspects are possible, and modifications may be made to the exemplary aspects. Therefore, the specification is not meant to limit the disclosure. Rather, the scope of the disclosure is defined only in accordance with the following claims and their equivalents.

Aspects may be implemented in hardware (e.g., circuits), firmware, software, or any combination thereof. Aspects may also be implemented as instructions stored on a machine-readable medium, which may be read and executed by one or more processors. A machine-readable medium may include any mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others. Further, firmware, software, routines, instructions may be described herein as performing certain actions. However, it should be appreciated that such descriptions are merely for convenience and that such actions in fact results from computing devices, processors, controllers, or other devices executing the firmware, software, routines, instructions, etc. Further, any of the implementation variations may be carried out by a general purpose computer.

For the purposes of this discussion, the term "processor circuitry" shall be understood to be circuit(s), processor(s), logic, code, or a combination thereof. For example, a circuit can include an analog circuit, a digital circuit, state machine logic, other structural electronic hardware, or a combination thereof. A processor can include a microprocessor, a digital signal processor (DSP), or other hardware processor. The processor can be "hard-coded" with instructions to perform corresponding function(s) according to aspects described herein. Alternatively, the processor can access an internal and/or external memory to retrieve instructions stored in the memory, which when executed by the processor, perform the corresponding function(s) associated with the processor, and/or one or more functions and/or operations related to the operation of a component having the processor included therein.

In one or more of the exemplary aspect described herein, processor circuitry can include memory that stores data and/or instructions. The memory can be any well-known volatile and/or non-volatile memory, including, for example, read-only memory (ROM), random access memory (RAM), flash memory, a magnetic storage media, an optical disc, erasable programmable read only memory (EPROM), and programmable read only memory (PROM). The memory can be non-removable, removable, or a combination of both.

What is claimed is:

1. A communication system, comprising:
   a mobile device including:
      a first transceiver communicatively coupled to a first antenna to communicate based on a first communication protocol via the first antenna;
      a second transceiver communicatively coupled to a second antenna to communicate based on a second communication protocol via the second antenna; and
      a first docking component communicatively coupled to the first transceiver and the second transceiver; and
   a base device including:
      a third antenna;
      a fourth antenna; and
      a second docking component communicatively coupled to the third antenna and the fourth antenna, and configured to connect to the first docking component,
      wherein the first transceiver is further configured to communicate via the third antenna and the second transceiver is further configured to communicate via the fourth antenna based on a connection between the first docking component and the second docking component.

2. The communication system of claim 1, wherein the first transceiver is configured to communicate using the third antenna cooperatively with the first antenna.

3. The communication system of claim 1, wherein the first transceiver is configured to communicate via the first and the third antennas in a Multiple-input Multiple-output (MIMO) configuration.

4. The communication system of claim 1, wherein the second docking component is configured to connect to the first docking component using a wired connection.

5. The communication system of claim 1, wherein the connection established between the second docking component and the first docking component is configured to supply electrical power from the base device to the mobile device.

6. The communication system of claim 1, wherein the base device further comprises a memory that is accessible to the mobile device via the connection established between the second docking component and the first docking component.

7. The communication system of claim 1, wherein the first communication protocol is different from the second communication protocol.

8. The communication system of claim 1, wherein the first communication protocol is a cellular communication protocol and the second communication protocol is a non-cellular communication protocol.

9. The communication system of claim 1, wherein the base device further comprises a third transceiver communicatively coupled to one or more of the third antenna and the fourth antenna, wherein the third transceiver is configured to communicate using one or more of the respective first and the second communication protocols.

10. A mobile device, comprising:
- a first transceiver coupled to a first antenna to communicate based on a first communication protocol via the first antenna;
- a second transceiver having a second antenna to communicate based on a second communication protocol via the second antenna; and
- a docking component communicatively coupled to the first transceiver and the second transceiver and configured to connect the mobile device to an external base device having a third antenna and a fourth antenna,
- wherein, based on a connection between the docking component and the external base device, the first transceiver is further configured to communicate via the third antenna of the external base device and the second transceiver is further configured to communicate using the fourth antenna of the external base device.

11. The mobile device of claim 10, wherein the first transceiver is configured to communicate using the third antenna cooperatively with the first antenna.

12. The mobile device of claim 10, wherein the first transceiver is configured to communicate via the first and the third antennas in a Multiple-input Multiple-output (MIMO) configuration.

13. The mobile device of claim 10, wherein the docking component is configured to establish a wired connection with the external device to connect the mobile device to the external base device.

14. The mobile device of claim 10, wherein the mobile device is configured to receive electrical power from the external base device via the docking component.

15. The mobile device of claim 10, wherein the mobile device is configured to access an external memory within the external base device via the docking component.

16. An external base device, comprising:
- first and second antennas; and
- a docking component communicatively coupled to the first and the second antennas, and configured to connect to a mobile device having first and second transceivers,
- wherein, based on a connection between the docking component and the mobile device, the docking component is configured to communicative couple the first and the second antennas to the first transceiver and the second transceiver, respectively, in the mobile device.

17. The external base device of claim 16, wherein the first antenna is configured to communicate based on a first communication protocol cooperatively with a third antenna within the mobile device, and the second antenna is configured to communicate based on a second communication protocol cooperatively with a fourth antenna within the mobile device.

18. The external base device of claim 16, wherein the first antenna is configured as a Multiple-input Multiple-output (MIMO) antenna that cooperatively communicates together with the third antenna within the mobile device in a MIMO configuration.

19. The external base device of claim 16, wherein the docking component is configured to establish a wired connection with the mobile device to connect the external base device to the mobile device.

20. The external base device of claim 18, wherein the second antenna is configured as a MIMO antenna that cooperatively communicates together with a fourth antenna within the mobile device in a MIMO configuration.

* * * * *